United States Patent
Henderson

[19]

[11] Patent Number: 6,043,739
[45] Date of Patent: Mar. 28, 2000

[54] HYPERVISION AUXILIARY TAILLIGHT ARRAY

[76] Inventor: Maurice Larue Henderson, 8140 S. Cottage Grove, Chicago, Ill. 60619

[21] Appl. No.: 09/176,195

[22] Filed: Oct. 21, 1998

[51] Int. Cl.$^7$ .................................................. B60Q 1/26
[52] U.S. Cl. .......................... 340/468; 340/468; 340/475; 315/77
[58] Field of Search .................................. 340/901, 468, 340/475, 431, 84; 280/422; 315/77; 339/28

[56] References Cited

U.S. PATENT DOCUMENTS

| | | | |
|---|---|---|---|
| 2,975,401 | 3/1961 | Shupe | 340/84 |
| 3,866,169 | 2/1975 | Haglund | 340/79 |
| 5,212,469 | 5/1993 | Avellino | 340/475 |

*Primary Examiner*—Jeffery A. Hofsass
*Assistant Examiner*—Phung Hing Nguyen
*Attorney, Agent, or Firm*—John P. Halvonik

[57] ABSTRACT

A novel auxiliary taillight array for attachment to strategic locations on towed, or heavy hauling vehicles comprise a series of aligned, illuminated geometric configurations designed to substitute for a vehicle's permanently mounted inoperable, or obscured identical configurations, thereby enhancing the visibility of vehicles of the second division during hours of darkness or adverse atmospheric conditions, and to readily identify such vehicles engaged in hazardous operations. The arrangement of lighting configurations will restore dimensional perception, and photometric output to vehicle combinations in which the rearward vehicle obstructs the tail light assembly of the forward vehicle. This auxiliary taillight array lighting unit includes peripheral lighting components on the front rear and sides of its housing, a central array of identification lights, marker lights, and flashing or oscillating amber-colored lights. The apparatuses include emergency flashers and turn signals, parking and brake signals, reflex reflectors and reverse indicators. A license plate housing, flange and white light is incorporated to facilitate the permanent mounting and illumination of additional registration plates over the normally required two.

5 Claims, 9 Drawing Sheets

HYPERVISION AUXILIARY TAILLIGHT ARRAY

FIELD AND BACKGROUND OF THE INVENTION

The invention relates to a vehicular auxiliary taillight array which will provide alternate lighting capability to vehicles of the second division involving any vehicular combination or configuration. Specifically the invention includes a new and improved vehicular auxiliary taillight array that will restore state and/or federally mandated photometric output ability by illuminating the geometric configuration of the entire vehicle combination in cases where the tail lamps of the host vehicle are obstructed by a towed vehicle, or whereby the extreme size (especially width) of a heavy load necessitates such precaution.

An integral part of this invention includes the incorporation of a registration plate housing, flange, and white light to facilitate the permanent mounting and illumination of an additional registration plate (over the normal two) when required by any state's mandate. The unit is designed to meet federal, state, and municipal requirements for vehicles engaged in hazardous operations.

DESCRIPTION OF THE PRIOR ART

Second division vehicles, particularly those engaged in the towing, hoisting, or hauling of extremely large loads require their geometric configurations be enhanced with the use of an auxiliary lighting system. This is deemed necessary in cases where the load partially or completely cancels the effect of the host vehicle's permanently mounted taillight display.

Seaburg; U.S. Pat. No. 4,859,982, Depicts a wireless module activated auxiliary lighting system that exhibits a limited light display. The utilization of such display incorporates turn signals, parking/courtesy lamps, and stop lamps which are inadequate for applications involving vehicles engaged in the towing, hoisting, or heavy/special hauling. Another disadvantage realized when scrutinizing its total concept is the facilitation of batteries to energize its lighting components, opposed to a direct cable connection to the electrical system of the host vehicle. Its span of operation is limited, due to the capacity of its internal power source/four size C batteries. The illumination of such lighting features requires a source that is capable of delivering ample amperage/power necessary to sustain its operation.

Zeidler, U.S. Pat. No. 5,434,758. An apparatus with telescoping capability to enable its attachment to standing or towed vehicles. Incorporated within its design are head lights, turn signals, hazardous, reverse, and brake lights. Its light features aren't capable of simultaneous display or illumination because interchangeable lights and lenses must be configured prior to its utilization in order to facilitate the desired effect. Illumination is accomplished via a portable power source contained in a car window mounted control box and a direct cable connection to the host vehicle.

The inventor further stipulated that the control box can be mounted on the door window of a towing vehicle for easier access. Independent activation of these features is separate from the activating system of the host vehicle and will require the driver to double his effort when manipulating duplicate controls, and may result in forgetful activation of said systems, thereby nullifying its purpose and creating a hazardous situation.

McGehee, U.S. Pat. No. 4,974,125 pertains to a permanent replacement bumper affixed to the rear of a semi truck/tractor, trailer frame. An electrical connection via the vehicles electrical system provides for the illumination of its courtesy, brake, hazardous, license plate lamp and turn signals. Its purpose doesn't in anyway compete with that of the HyperVision Auxiliary Taillight Array in that it is a permanent modification to a trailer displaying such concept.

Chudzid, U.S. Pat. No. 5,157,591 wherein his invention illustrates an attachable vehicular auxiliary lighting system, consisting of two separate lamps powered via an electrical cable to the hose vehicle. The purpose of such invention appears to facilitate the replacement of red flags currently placed on extended or oversize loads. Having a single purpose it has no means of illuminating the geometric configuration of a vehicle thereby resulting in the loss of those properties that are beneficial and possessed by the HyperVision Auxiliary Taillight Array.

SUMMARY OF THE INVENTION

It is the object of the HyperVision Auxiliary Taillight Array to provide an auxiliary taillight system, primarily for use with vehicles of the second division engaged in hazardous operations. When attached to strategic locations on such vehicles or vehicle combinations it will enable the motorized and pedestrian public the benefit of observing and avoiding a potentially harmful or tragic situation.

Attributes of this invention are comprised of aligned, illuminated geometric configurations designed to substitute for a vehicle's permanently mounted inoperable or obscured tail lights. One of its main objectives is to incorporate an arrangement of lighting configurations to restore dimensional perception to the towed vehicle, and to enhance its photometric output. Peripheral lighting on the front, rear, and sides of the housing allow for the transmission of mandated light indicators in all direction.

It is an objective of this invention to incorporate within the main body of the HyperVision Auxiliary Taillight Array a central array of vertical identification light units. Flashing or oscillating amber colored horizontal lights are located between the central and peripheral lighting units. The central and flashing units are also located on both the front and rear of the housing. The housing also includes emergency flashers and turn signal lighting units, parking and brake signals and reverse indicators. The reverse indicators are arranged between the central array lighting units. The parking/brake and flasher/turn signal lights are below the flashing amber horizontal lights and are on either side of the array. An integrated registration plate housing, flange and white light, supports the mounting of a registration plate to the auxiliary apparatus.

It is an object of the present invention to provide a new and improved vehicular auxiliary taillight array that meets federal, state and municipal regulations required by vehicles of the second division.

It is another object of the present invention to provide a new and improved vehicular auxiliary taillight array which may be easily and efficiently manufactured and marketed.

It is among the objectives to provide a lighting array for towed, and special hauling vehicles that incorporate lighting units on the peripheral edges of the lighting array so as to indicate to both oncoming and chase vehicles the width of the vehicles and the intent of its operator.

Another object is to provide lateral lighting units for vehicles of the second division so as to illuminate and allow vehicles approaching at a 90-degree angle (i.e. at a position lateral to the rear of a vehicle employing this invention) to recognize and safely pass any vehicle mounting such an array.

Another object of this invention is to provide identification lamps on both sides of the lighting unit that exhibit distinct color patterns so that when viewed from the front or rear of the vehicle such array will indicate to the general public the operating classification of such vehicles or combination of vehicles.

Another object is to provide visual recognition clues as to the direction of travel of a towed vehicle combination or special hauling vehicle mounting this apparatus.

Another objective of this invention is to enable passersby, both forward, lateral to and in rear of; the towed vehicle, to visually discern the width of the towed vehicle combination by observing the clearance lights that illuminate the peripheral edges of the lighting array.

It is a further object of the present invention to provide a new and improved vehicular auxiliary taillight array which is of a durable, easily serviceable, and reliable construction.

An even further object of the present invention is to provide a new and improved vehicular auxiliary taillight array which is susceptible of a low cost of manufacture.

Still another object of the present invention is to provide a new and improved vehicular auxiliary taillight array to provide enhanced visibility of an associated vehicle combination, or oversize load.

Another objective is to provide a vehicular auxiliary taillight system incorporating a registration plate housing, flange and white light to facilitate the permanent attachment and illumination of said plate according to government requirements.

Other objects and features of the present invention will be apparent from the following detailed description of the preferred embodiment.

BRIEF DESCRIPTION OF THE DRAWINGS

FIG. 2-A, front view of the amber oscillating or flashing lamps;

FIG. 2-B; rear view of the amber oscillating or flashing lamps;

FIG. 3-A, front view of three identification lamps;

FIG. 3-B rear view of three identification lamps;

FIG. 4-A front view of two clearance lamps mounted at the ends of the H.A.T. housing;

FIG. 4-B rear view of two clearance lamps mounted at the ends of the H.A.T. housing;

DESCRIPTION OF THE PREFERRED EMBODIMENT

The invention described herein is a new and improved auxiliary tail light apparatus for use with vehicles classified as those belonging to the second division. The overall construction of the apparatus is as shown in FIGS. 1–12 and FIG. 1 shows the different individual lighting components. The invention involves up to seven distinguished functional lighting units that are preferably incorporated within an integral housing for mounting at a strategic location of a towed vehicle or special hauling vehicle.

It is preferred that all components of the HyperVision Auxiliary Taillight Array be enclosed in a durable hard plastic or fiberglass body producing an integrated construction of lamps and housing. To facilitate the ease of manufacturing and maintenance, the housing should be of a two piece body and having an integrated registration plate housing. Each orifice of the housing allows for the easy installation and replacement of components and typically includes the lighting unit that is installed in that particular section of the housing. This enclosure or housing may be constructed using any suitable process. It is believed that an injection molding process would be the most optimum way to manufacture the enclosure. Hard plastic or fiberglass are the preferred materials for the housing and an injection molding process is the preferred method of manufacture.

Each of the various electrical lighting units mounted within the housing is preferably energized by a power source associated with the towing or host vehicle. Each lighting unit may be actuated by the operator controls of the host vehicle via a multi wire cable. Integrated with the host vehicle's corresponding light circuits, this cable will extend to the rear of such vehicle where a female electrical receptacle should be permanently mounted in the fender, bumper, or any sturdy area thereof. Coupling of the auxiliary taillight array to the host vehicle's electrical light circuit will be accomplished via a multi wire cable and male electrical receptacle. An audible reverse warning device may be internally mounted in the housing as an option. See description below.

A variety of mounting attachments may be used to secure the HyperVision Auxiliary Taillight Array to a disabled vehicle or load associated with a vehicle of the second division. Such arrangements may comprise web belts, magnetic suction cups, brackets or a combination thereof allowing for an optimum means of attachment.

Figure 1:
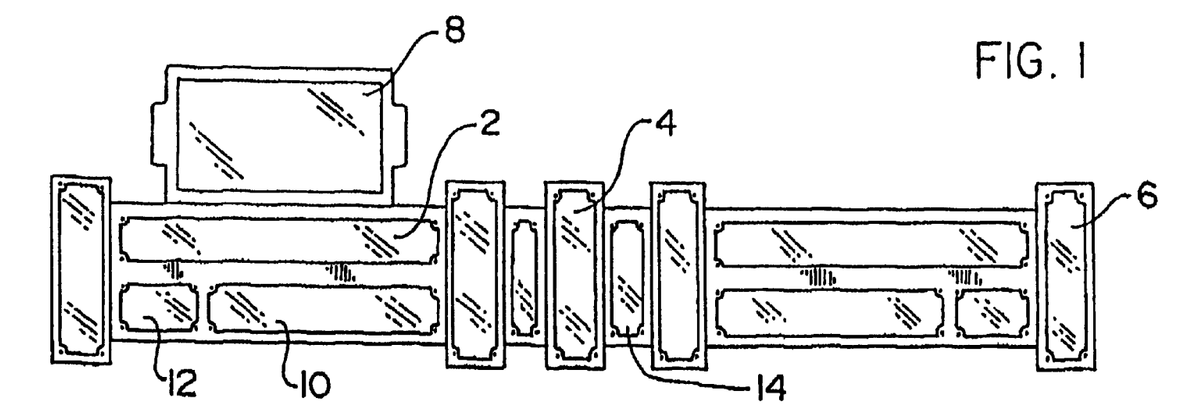
FIG. 1 overall structure of the apparatus, rear view as seen by operators in trailing vehicles.
Figure 2:
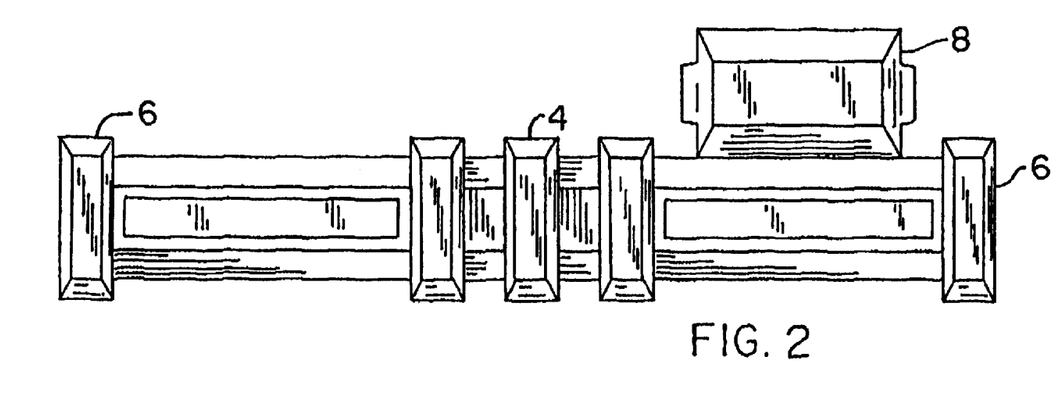
FIG. 2 front view of apparatus, as seen by vehicle operators leading a vehicle mounting the display.
Figure 2A:
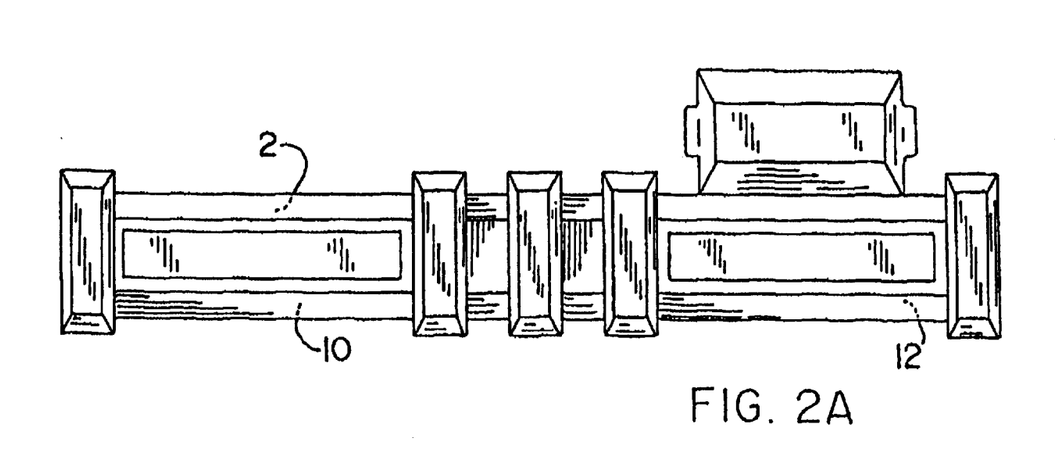
Figure 2B:
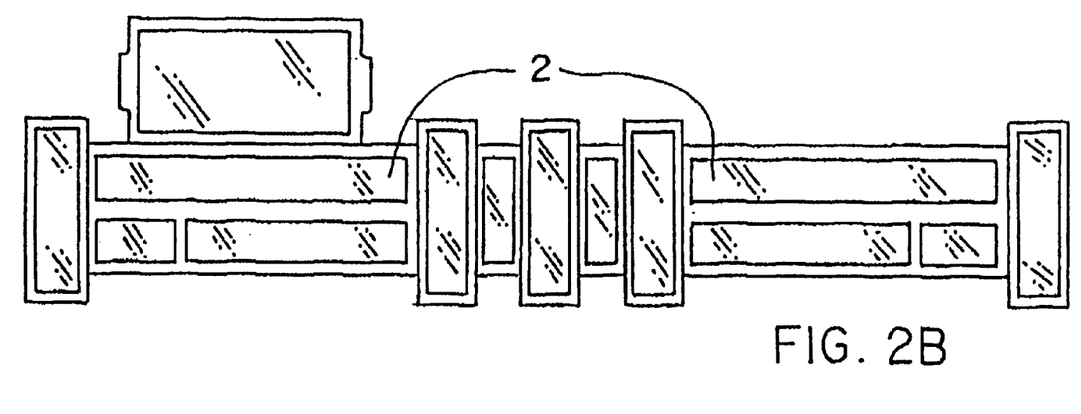

Amber oscillating, rotating or flashing lamps (2 in FIG. 1). An amber oscillating, flashing or rotating light incorporates a light enclosure, standard automotive single prong/contact light socket, single filament light bulb, or strobe light, mounted in a protective enclosure/housing, in which the above mentioned light bulb is connected via a wire loom, within the main body. One side of the light enclosure remains open to facilitate its servicing and for the disbursement of said light. Depending on its application (tow truck, wrecker, special hauling vehicle, police or fire dept vehicle) the opening for this light shall be covered with the appropriate colored lens (e.g. amber or red) that will be appropriate to indicate such vehicle's purpose, thereby signaling a warning to the motorized and pedestrian public.

Such light shall mount to the front and rear of the housing as depicted in the accompanying drawings. See FIGS. 2A & 2B. In this instance both the front and rear lights of the flashing or oscillating lighting unit 2 should be of amber color and shall remain illuminated when a vehicle of the second division is engaged in any hazardous operation.

Identification Lamps 4. Identification lamps are an arrangement of three lamps on a horizontal line and centered on the front and rear of a second division vehicle. A single lamp is constructed of a light enclosure, standard automotive single prong/contact light socket, light bulb, enclosure/ housing, and a red or amber lenses cover which facilitates the protection and replacement of said bulb and the disbursement of its light. Such light shall mount to the front and rear of the apparatus as depicted in the accompanying drawings. See FIGS. 3A & 3B.

Figure 3A:
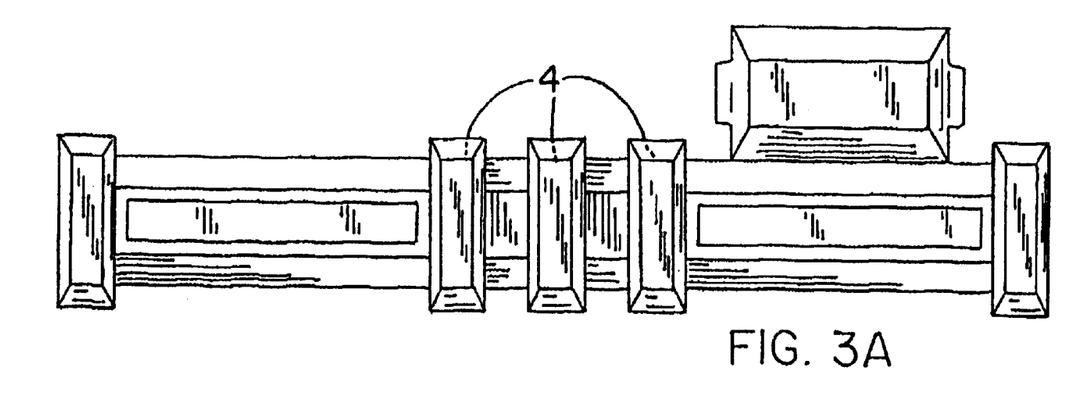
Figure 3B:
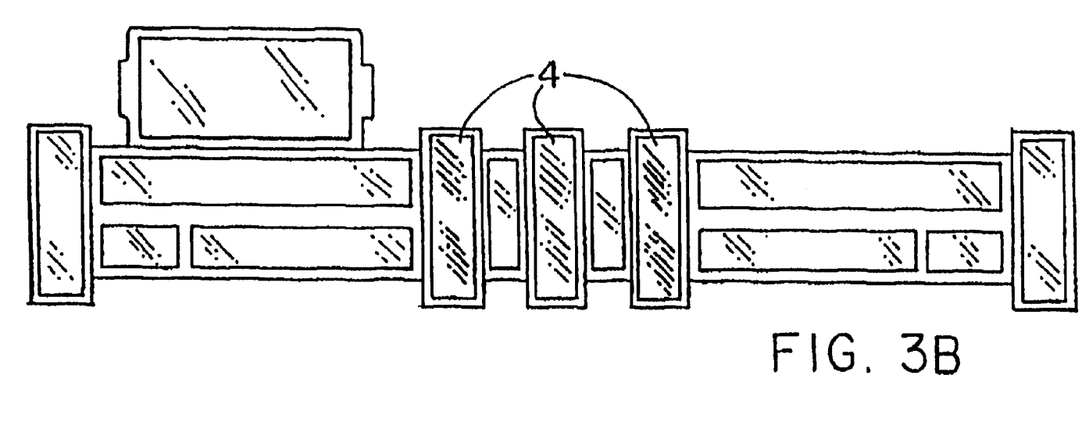
Figure 4A:
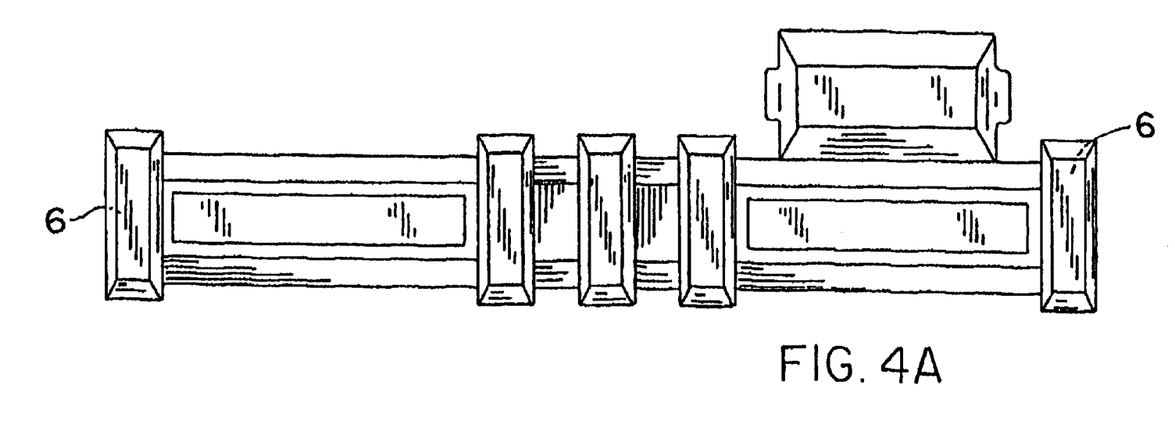
Figure 4B:
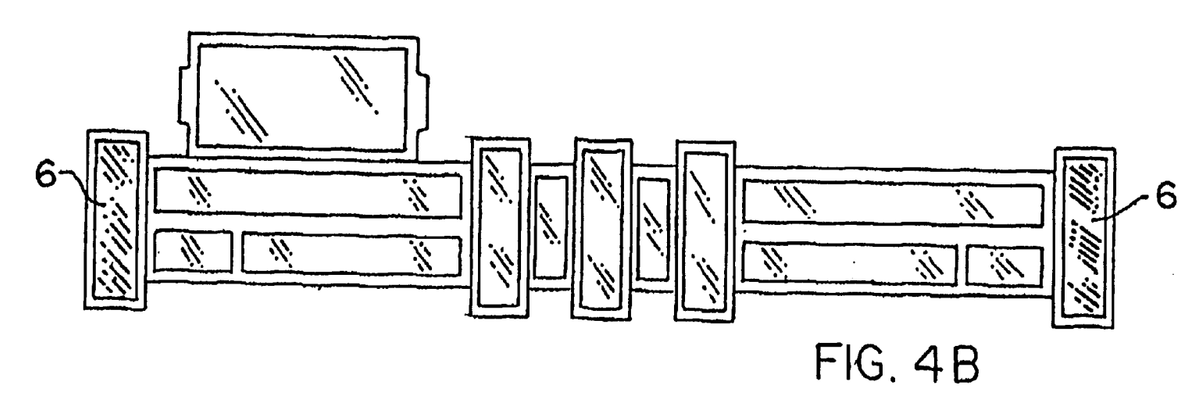

The front units of the central, vertically arranged identification lamps 4 should be amber and the rear units should be of red color. Thus an oncoming vehicle will be able to discern an amber colored peripheral, horizontal and central lights. A vehicle following a vehicle of the second division engaged in a hazardous operation will view red central identification and peripheral lights and amber horizontal flashing/oscillating lights. Thus a distinct color pattern is presented to those vehicle operators approaching from the front and those following such vehicles to thereby better convey its direction of travel.

Clearance lamps 6 are mounted at the front and rear corners of the HyperVision Auxiliary Taillight Array. These lamps are constructed of a light enclosure having a standard automotive single prong/contact light socket, and a single filament light bulb, and a red or amber lens cover to facilitate replacement and disbursement of its light. Such required lights mark the overall width of the combined vehicle configuration enabling other vehicle operators to safely pass without incident given. This particular light shall be mounted to the front and rear of the apparatus as depicted in the accompanying drawings. See FIGS. 4A & 4B.

It is necessary to have peripheral lighting units on the front, rear and sides of the lighting array so that vehicle operators approaching a vehicle of the second division engaged in a hazardous operation may be able to visually appreciate the width of the vehicles combination.

It is preferred that these peripheral lighting units 6 be of amber color on the front side and of red color on the rear of the lighting array. These peripheral lights should be mounted so that vehicles approaching from the front or rear of a second division vehicle will realize that they are nearing an area in which caution must be taken.

Peripheral lights 6, identification lights 4, should be activated by the vehicle operator when certain conditions dictate their use. Both the front and rear sections are deemed necessary to maintain such illumination to provide visual manifestation to pedestrian and vehicular traffic near or in the presence of a vehicle mounting the lighting apparatus.

Figure 5:
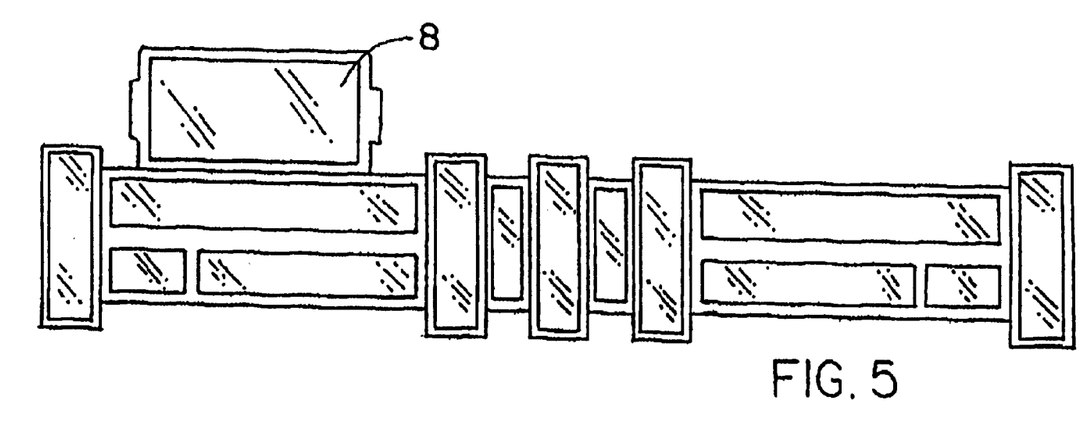
FIG. 5 front view of the registration plate housing.

FIG. 5 depicts the registration plate housing 8 and accompanying flange. Construction of the main body of the HyperVision Auxiliary Taillight Array including its integrated registration plate housing should be constructed utilizing a hard durable plastic injection molding, or fiberglass casting process. Within the registration plate housing shall be a metal flange on which an additional/third registration plate, as mandated by regulation, may be securely attached.

In that slower moving vehicles are required by law to travel in the right hand lane of the highway, the registration plate housing 8 when viewed from the rear of such apparatus shall be strategically positioned over the left horizontally oriented flashing amber colored light 2, to better facilitate the easier reading of the vehicle's state of registration and registration number by motorists passing on its left side. In this manner, envisioning an imaginary center line drawn vertically through the central bank of lights (identification lamps), the registration plate and its accompanying holder will be to the left of the lighting array's center.

The registration plate lamp shall be housed in an enclosure integrated within the registration plate housing. In that it is a part of such housing it also is constructed using the plastic injection mold process. Illumination of this plate should be accomplished by incorporating a light enclosure (20 in FIG. 6), single prong/contact light socket, single filament automotive light bulb in the window/opening within the registration plate lamp housing.

Figure 6:
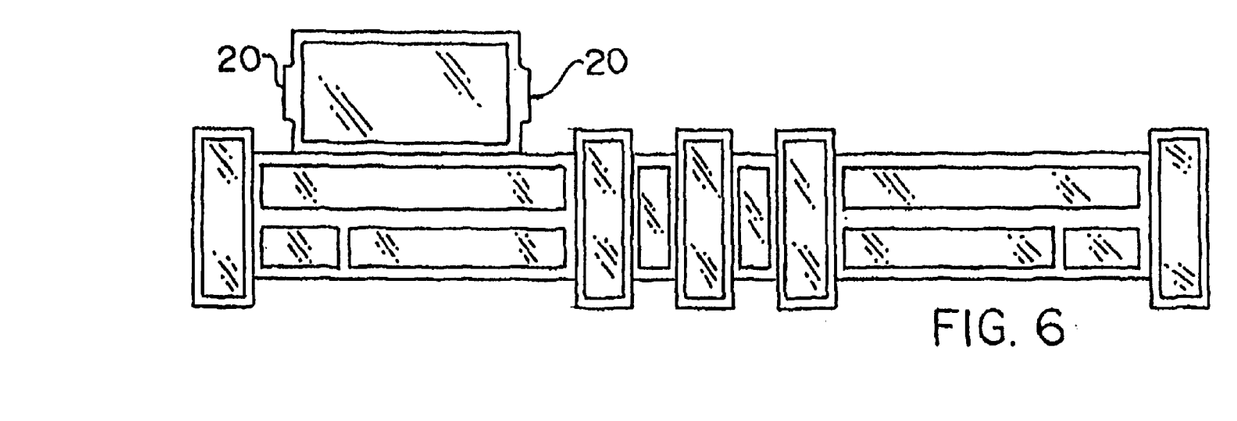
FIG. 6 location within the registration plate housing showing white lamps in license plate housing.

A clear/translucent lenses cover should facilitate bulb replacement and protection FIG. 6. It is preferred that the license plate holder have at least 2 white lighting units (20 in FIG. 6) disposed on the left and right sides of the securing area so as to effectively illuminate the license plate from the sides.

Figure 7:
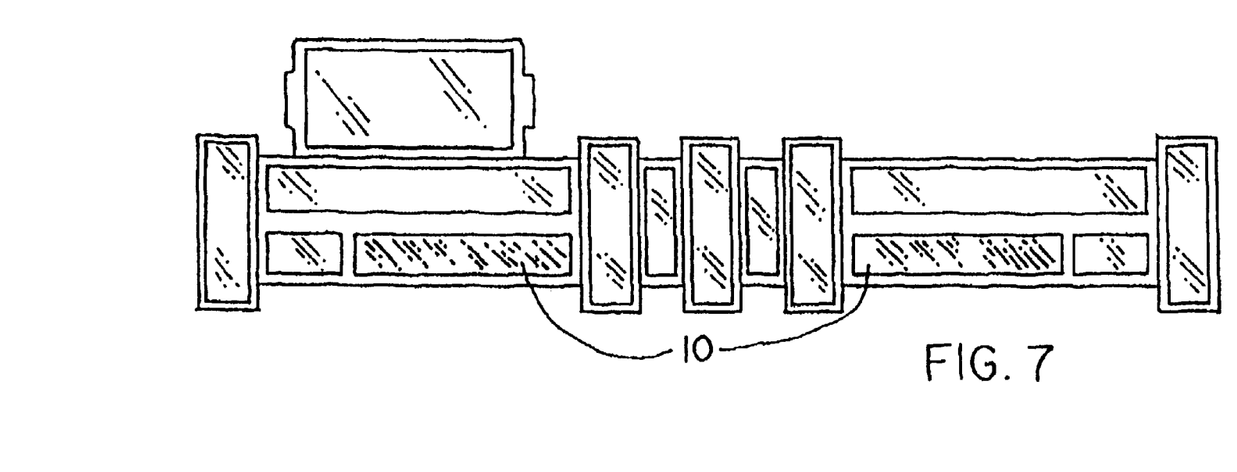
FIG. 7 location of the brake lamps, said housing to also double as that of the courtesy/parking lamps.

Brake Lamps 10. The brake lamps shall incorporate a light enclosure standard automotive two prong/contact light socket, two filament light bulb, and a removable red lenses cover to facilitate the servicing and protection of said bulb. FIG. 7.

Courtesy/Parking Lamps 10. These courtesy/parking lamps are mounted in the same housing as the brake lamps. The common composition of the courtesy/parking lamps facilitate the sharing of a single housing component by two lamps. This is due to the jointly utilized light enclosure and two filament bulb. The smaller gage and dimmer filament will be utilized to illuminate the courtesy lamp, while the heavier gauged and brighter filament will illuminate the brake lamps, FIG. ∩7.

The courtesy/parking lights and brake lights should be of two different intensities and disseminating a red light so that motorists or pedestrians in the presence of second division vehicles engaged in a hazardous operation will be able to discern such hazard. Motorists and pedestrians will see a more intense light when the brakes are depressed. This function can be accomplished by using a two filament bulb in the aforementioned light housing component accommodating the courtesy/parking lights and brake lights.

Figure 8:
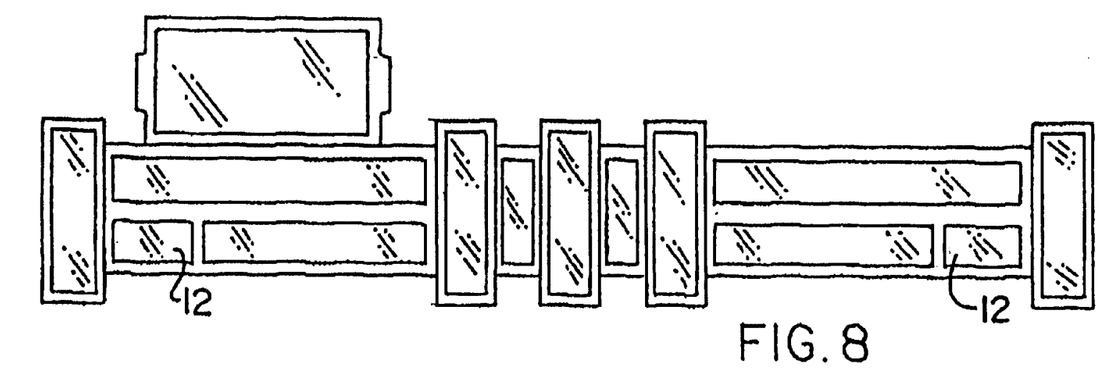
FIG. 8 the location of the turn signal lamps.

Turn Signals Lamps 12. The turn signals will consist of a light enclosure standard automotive single prong/contact light socket and single filament light bulb mounted in an enclosure/housing with an opening to facilitate the replacement of a defective bulb. This opening shall be closed with an amber or yellow lenses cover for protection. The lighter gage filament within the light bulb shall serve to illuminate the turn signal, while the heavier one illuminates the hazardous flasher. Activation of the turn signals shall occur when the operator of the host vehicle triggers its associated cab control lever. FIG. 8.

Figure 11:
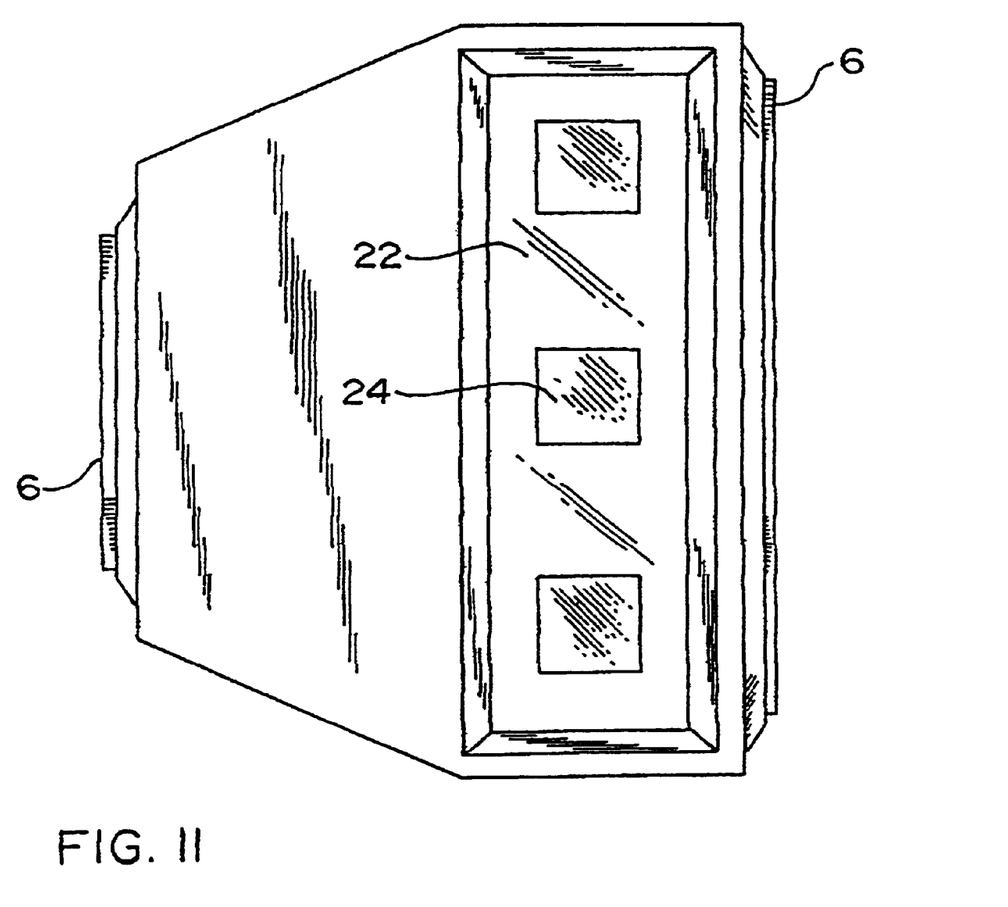
FIG. 11 the location of the reflex reflectors.
Figure 12:
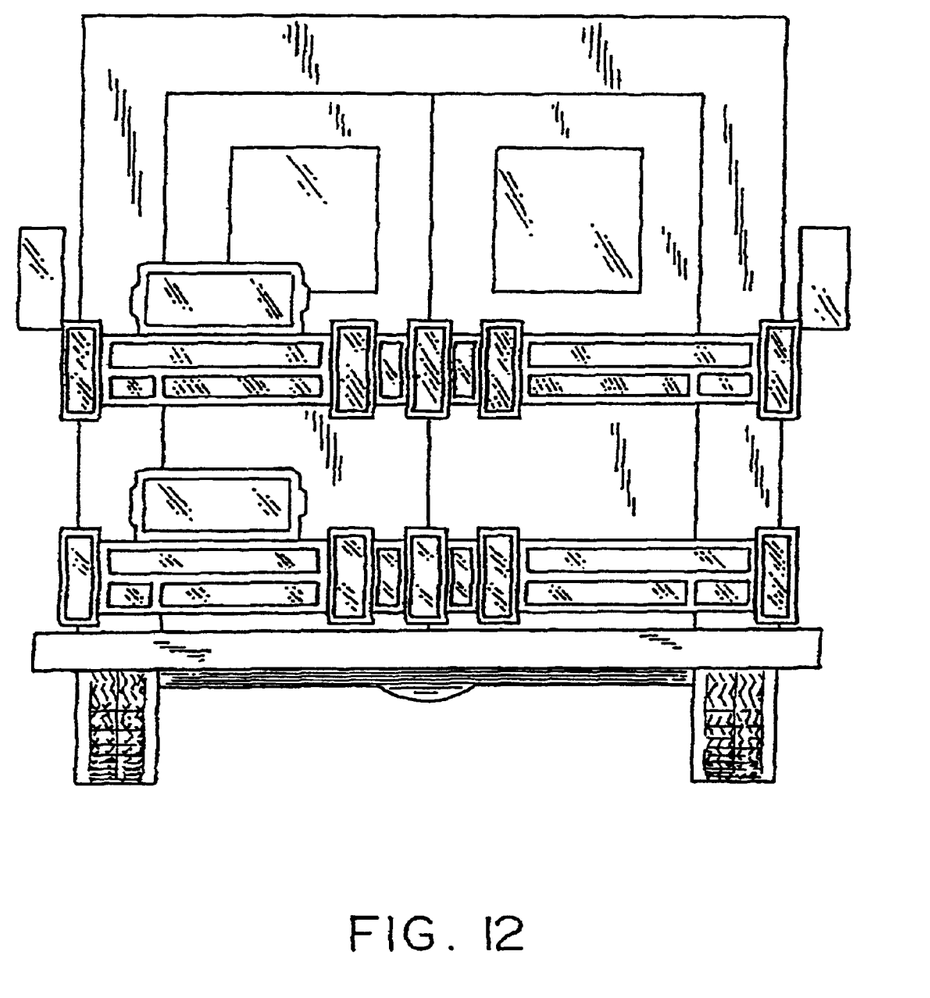
FIG. 12 apparatus mounted to the rear of a truck in tow as seen from a position in rear of that truck.

Side Marker Lamps 22. When placed in a strategic location the side marker lamps shall illuminate the sides of any vehicle or load to which it is mounted at a 90-degree angle to the main cluster of lights. It is constructed of an open end light enclosure, standard automotive single prong/contact light socket, single filament light bulb, and red lens cover. Servicing of a defective bulb shall be facilitated by removing the protective red lens cover through which its distinct color will identify the extreme end of such vehicle or combination of vehicles. FIG. 11.

Hazardous Flashers/turn signals 12. Same lamps as the turn signal lamps. The hazardous flashers shall consist of a light enclosure, standard automotive two prong/contact light socket and two filament light bulb mounted in an enclosure/housing in conjunction with the turn signal lamp and with an opening facilitating the replacement of a defective bulb. It is preferred that this opening be closed with an amber or yellow lenses cover for protection.

The light bulb contained in the individual light enclosure serves dual purposes. The lighter gage filament within the light bulb illuminates the turn signal, while the heavier gage filament illuminates the hazardous flasher. Activation of the turn signal may occur when the vehicle operator of the host vehicle triggers the associated cab control lever, FIG. 8. The preferred choice of color for its protective cover is amber.

Figure 9:
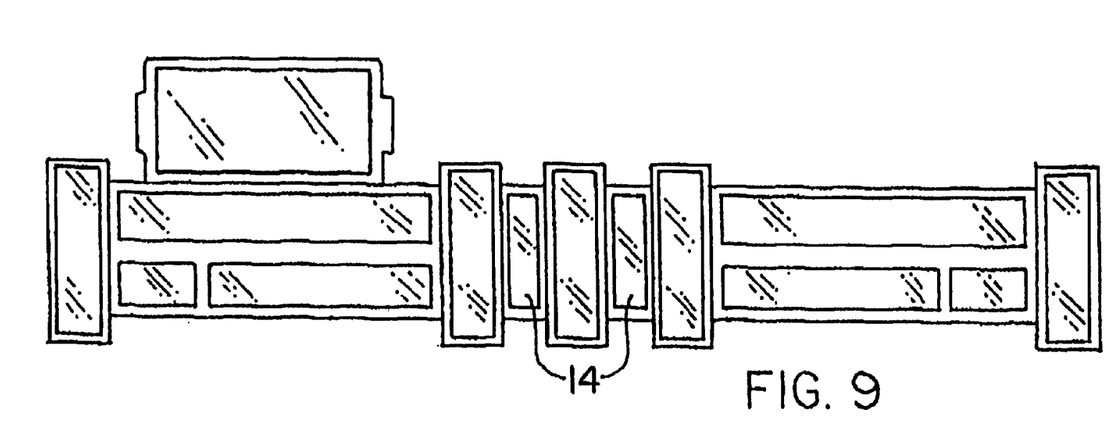
FIG. 9 the location of the reverse lamps.
Figure 10:
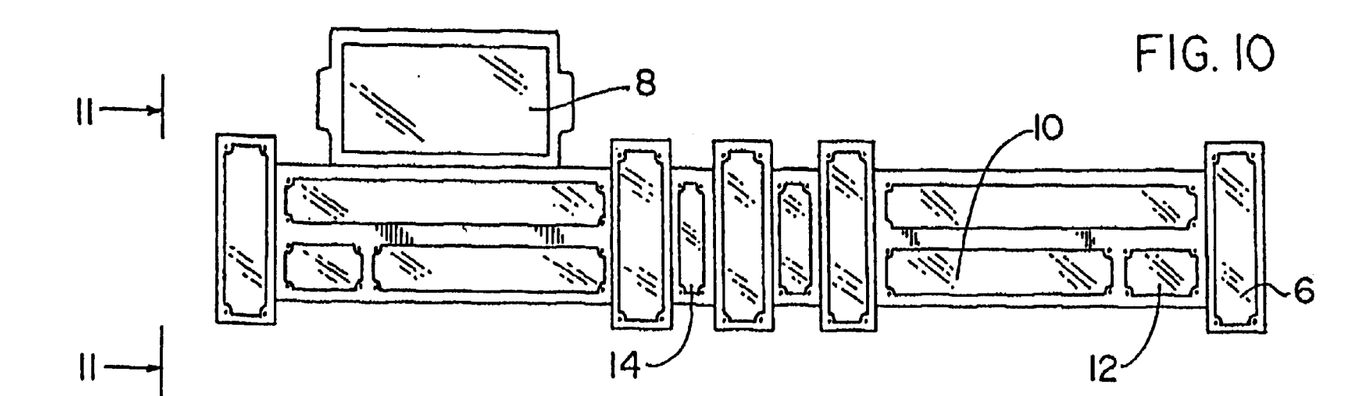
FIG. 10 Identification of various sections of the housing.

Reverse Lamps 14. The reverse lamps shall consist of a light enclosure, standard automotive single prong/contact single light socket and single filament light bulb mounted in an enclosure/housing with an opening to facilitate the replacement of a defective bulb. Said opening shall be closed with a clear/transparent lenses cover for protection. Activation of the reverse lamp shall occur when the operator of the host vehicle places his gear selector in reverse gear thereby triggering its illuminations. FIG. 9.

Reflex Reflector, 24 in FIG. 11. Reflex reflectors are an integral part of the lens covers of peripheral lights, side marker lamps, courtesy/parking lights, and brake lights. When a vehicle is parked during hours of darkness and with all power turned off to its external lamps, reflex reflectors will enhance the visibility of such vehicle when the head light beam of another vehicle strikes it, making visible an otherwise non-discernible parked vehicle. FIG. 11.

The reflex reflector shall be incorporated into the design of the brake lamps, identification lamps, clearance lamps and side marker lamps lenses. Its interior cut allows a light beam striking such lens to be thrown/reflected back to its source, lighting up the otherwise dark or non-discernible geometric configuration of a parked vehicle FIG. 11.

Audible Reverse Warning Device: An audible warning device may be installed on the interior of the main body of the HyperVision Auxiliary Taillight Array. When activated in conjunction with the reverse lamps, such audible warning may be emitted through a grill on the bottom of the main body and when the appropriate gear is selected by the host vehicle operator.

All of the above lights shall be housed within the main body of the HyperVision Auxiliary Taillight Array. Illumination shall occur when the host vehicle cab parking/head lamp light switch is place in the "P" parking light on position and remain on when said switch is advance to he head lamp on position, when the host vehicle is shifted into reverse gear, and when the turn signal lever is shifted to and activating position.

It should be recognized that the electrical connections from the host vehicle to be made with those of the Hyper-Vision Auxiliary Taillight Array via electrical receptacles, to allow for the activation of the corresponding lights of the lighting array. Depressing the brake peddle will result in the illumination of the brighter filament within the shared enclosure of the courtesy/parking light and brake light 10. Shifting the host vehicle into reverse will result in activation of the lighting array's reverse lights 14. The activation of either turn signal or hazardous flashers controls will cause the illumination of a two filament bulb sharing the same light enclosure. Each filament serving a separate purpose.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighting apparatus for use in connection with second division vehicles engaged in hazardous operations, said apparatus comprising a housing having apertures for support of lighting units, said housing being of integral construction and having a means for providing an electrical current from said second division vehicle to corresponding lighting units in said housing, said housing of rectangular construction so as to have a length greater than a width and being of a length about equal to the width of said second division vehicle, said housing having two peripheral edges, a front and rear surface, a centerline running parallel to said length so as to divide said apparatus into upper and lower halves and a mid section about midway between said peripheral edges; said housing having a central lighting array of at least three vertically oriented lighting units, each of said vertically oriented lighting units in parallel relationship to one another and each of said vertically oriented lighting units in connection with said rear surface of said housing, said central lighting array in connection with said midsection of said housing, said vertically oriented lighting units of red color; a second lighting array in connection with said front of said housing and having at least three vertically disposed lighting units in parallel relation to one another and said second array having lights of amber color; a first pair of peripheral lighting units each in connection with said peripheral edges of said housing, said first pair of peripheral lighting units of red color and a second pair of peripheral lighting units in connection with said peripheral edges of said housing, said second pair of peripheral lighting units of amber color; said peripheral lighting units extending around said peripheral edges of said housing.

2. The apparatus of claim 1 having a pair of horizontally disposed lighting units, each of said horizontally disposed lighting units between said central lighting array and one of said peripheral edges, said horizontally disposed lighting units in parallel relation to the length of said housing, said horizontally disposed lighting units of amber color and in connection with said front and rear of said housing; said horizontally disposed lighting units having a means to provide an intermittent lighting signal.

3. The apparatus of claim 2 having a set of brake warning lights in connection with said rear of said housing and located between said peripheral lighting units and said central lighting array, said brake warning lights in connection with the brake system of said second division vehicle so as to provide a visual indication of braking when said brake system is utilized.

4. The apparatus of claim 3 having a set of turn signal indicating lights in connection with the rear of said housing and located between said brake warning lights and said central lighting array; said turn signal lights having a means to activate said lights when a turn is being made by the towing vehicle, said turn signal lights of amber color.

5. The apparatus of claim 4 having a set of reverse warning lights in connection with said rear surface of said housing and located in between said vertically oriented lighting units in said central lighting array, said reverse warning lights having a means for activation when said towing vehicle is moving in a reverse direction.

\* \* \* \* \*